US005894665A

United States Patent [19]

Olmsted

[11] Patent Number: 5,894,665

[45] Date of Patent: Apr. 20, 1999

[54] BEARING PULLER EXTENSION AND METHOD FOR EXTENDING SAME

[76] Inventor: Rodney Duane Olmsted, 7560 153rd Ave. SE, Wyndmere, N. Dak. 58081

[21] Appl. No.: 08/638,979

[22] Filed: Apr. 25, 1996

[51] Int. Cl.$^6$ .................... B23P 19/04

[52] U.S. Cl. .................... 29/898.08; 29/258; 29/259

[58] Field of Search .................... 29/898.08, 258, 29/259, 260, 264, 265, 724, 278, 280, 464

[56] References Cited

U.S. PATENT DOCUMENTS

| | | | |
|---|---|---|---|
| 3,358,352 | 12/1967 | Wilcox | 29/263 |
| 3,465,407 | 9/1969 | Rau | 29/259 |
| 3,887,989 | 6/1975 | Maynard | 29/898.08 |
| 4,339,865 | 7/1982 | Shultz | 29/525 |
| 4,443,922 | 4/1984 | Deland | 29/254 |
| 4,542,571 | 9/1985 | Sullivan | 29/256 |
| 4,571,802 | 2/1986 | Calhoun et al. | 29/157.3 |
| 4,651,596 | 3/1987 | Rachanski | 29/264 |
| 4,724,608 | 2/1988 | Parrott | 29/264 |
| 4,869,482 | 9/1989 | Beccaceci | 269/239 |
| 5,228,180 | 7/1993 | Bauer et al. | 29/258 |
| 5,255,435 | 10/1993 | Shultz | 29/898.08 |
| 5,406,685 | 4/1995 | Harmand | 29/255 |
| 5,519,929 | 5/1996 | Bleckman | 29/264 |

*Primary Examiner*—Larry I. Schwartz
*Assistant Examiner*—Marc W. Butler
*Attorney, Agent, or Firm*—Curtis V. Harr

[57] ABSTRACT

A tool for extracting bearings from a long shaft as well as method of doing same is disclosed. This method and tool begins with connecting a split sleeve about a stuck bearing. This sleeve is then placed in a case. One or more extension are then added, thus allowing the puller to reach bearings on long shafts. When a sufficient number of extensions are added, a cap having an extraction bolt, which engages the end of the bearing shaft inside of the puller is attached. The extraction bolt is then rotated in a clockwise manner which forces the puller, and the engaged bearing, in an outward manner from the bearing shaft. When the extraction bolt is rotated to the extent of its working range by being turned all the way in, the puller is disengaged from the bearing and an extension section is then removed. This allows the extraction bolt to be rotated in a counter clockwise manner to a point were it regains its full working range. The present invention is then reengaged to the bearing shaft and bearing and the process is repeated until the bearing is completely removed from the bearing shaft.

2 Claims, 5 Drawing Sheets

BEARING PULLER EXTENSION AND METHOD FOR EXTENDING SAME

BACKGROUND OF THE INVENTION

The present invention relates to an improvement in an bearing puller which allows for the removal of bearings from deeply recessed areas or from inside positions on long, extended rotational shafts. More specifically, the present invention provides a means varying a bearing pullers range by allowing for the addition or removal of sections to the body of the puller thereby allowing the working range of the puller to accommodate shafts of different lengths.

Often times in doing routine maintenance on a farm, factory or in a commercial repair shop it is necessary to replace bearings that have become locked onto a shaft. One method of doing this is through the use of heat applied with a torch and use of a hammer and chisel. However, many situations do not allow for the use of a torch due to heat sensitive material. Other times a bearing cannot be reached due to a deeply set location.

In the past, one would need specialized tools to remove deeply set bearings or bearings from long shafts. This would result in the necessity of using two or three tools to do one job, thereby not only increasing the time needed to complete the work, but also increasing the costs of maintaining equipment.

One example of a standard style bearing puller commonly used in the field is illustrated by U.S. Pat. No. 4,443,922, issued to Deland on Apr. 24, 1984. The problem with, this puller is that it is too short in its design to be used to remove deeply set bearings or bushings from long shafts and merely lengthening the puller would render it useless in tight situations. U.S. Pat. No. 3,358,352, issued to Wilcox on Dec. 19, 1967 is an example of a bearing puller designed specifically to remove deeply set bearings and bushings from long shafts. The Wilcox puller is often to long to be used as the bearing nears the end of a shaft during its removal. The end result of this is that the average user would need to have both of these tools, if not more, to handle many bearing removal jobs, thereby increasing both his costs of operation and his down time due to the necessity of switching between the tools at different stages of the operation.

From the forgoing discussion it can be seen that it would be advantageous to have one tool that would alone be adjustable to many different lengths. Further an adjustable length would allow for ease in storage. The disclosed bearing puller with extensions allows a user to pull bearings in this type of application without the need for added specialized tools, thereby reducing both the time and costs of the operation from the old method.

SUMMARY OF THE INVENTION

It is the primary objective of the present invention to provide a tool that will quickly and easily remove bearings from recessed areas and from long shafts.

It is an additional objective of the present invention to reduce the time and expense traditionally required to remove bearings in this type of application.

The disclosed adjustable bearing puller addresses these short comings of the prior art by providing a flange bearing puller that is expandable by the use of extension sections that can be added or subtracted from the body of said puller as needed by the particular job at hand. These sections are added or subtracted by the use of male threads located on the most reward end and female threads located on the most forward end. The male threads at the reward end of the of the extension member are threaded into the female threads of the puller cap or the female threads of another extension and the female threads at the forward end of the extension are engaged by the male threads of the puller case or another extension. This forms a hollow tube in which the bearing shaft fits, thereby allowing for the removal of a bearing located on a long shaft.

The typical operation of the present invention is to begin the bearing removal process by adding one or more extensions to the bearing puller, thus, allowing the puller to reach the bearing to be removed from a given length of shaft. Once contact is established by the puller, the extraction bolt, which engages the end of the bearing shaft inside of the puller, is rotated in a clockwise manner which forces the puller, and the engaged bearing, in an outward manner from the bearing shaft. When the extraction bolt is rotated to the extent of its working range by being turned all the way in, the puller is disengaged from the bearing and an extension section is then removed. This allows the extraction bolt to be rotated in a counter clockwise manner to a point were it regains its full working range. The present invention is then reengaged to the bearing shaft and bearing and the process is repeated until the bearing breaks free or is completely removed from the bearing shaft.

For a better understanding of the adjustable bearing puller, reference should be made to the drawings in which there is fully illustrated and described preferred embodiments of the present invention.

DESCRIPTION OF THE PREFERRED EMBODIMENT

Figure 1:
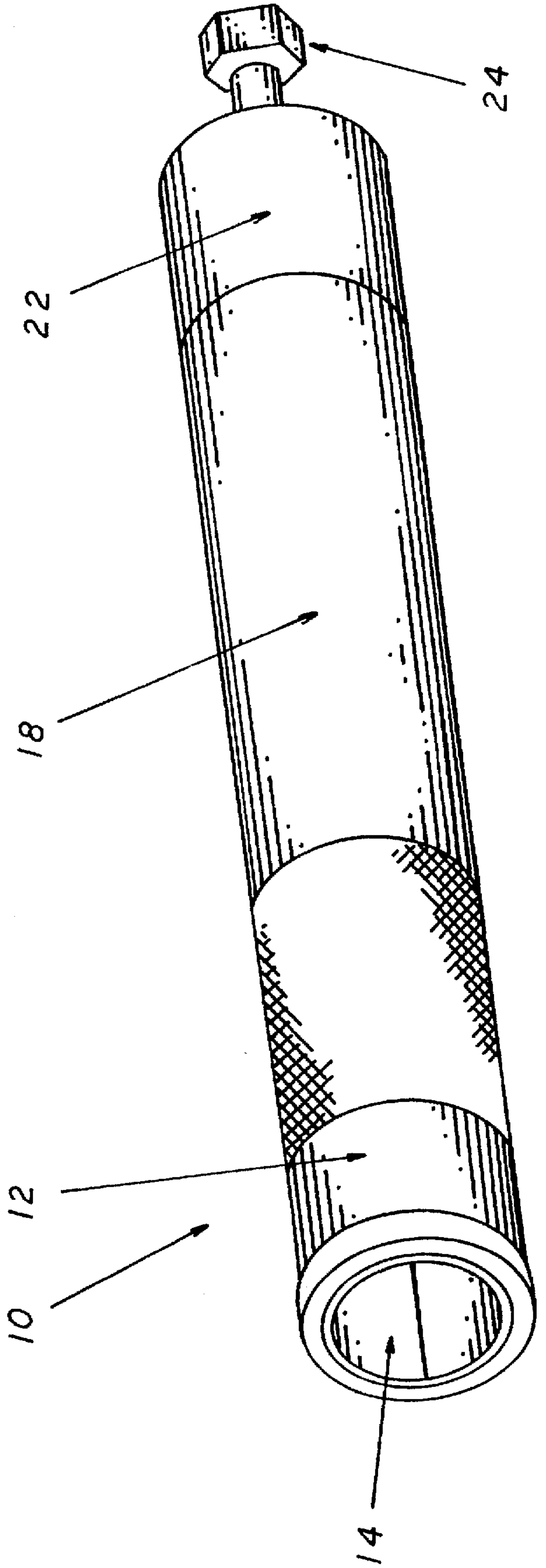
FIG. 1 is a perspective view of an adjustable bearing puller showing the orientation of its major components when it is in an extended position by the use of one extension member.
Figure 2:
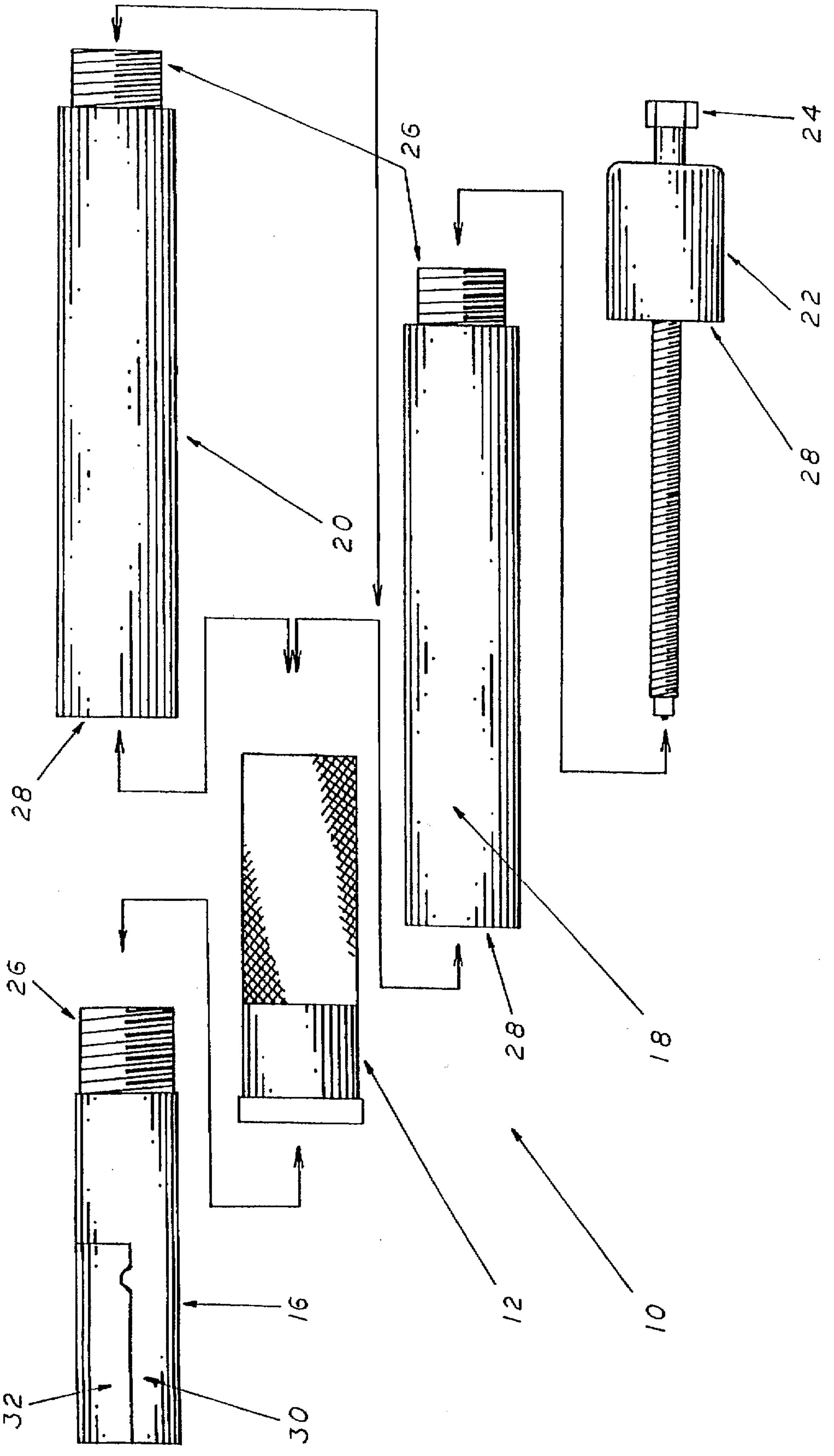
FIG. 2 is an exploded side elevation view of the present invention showing the manner in which the separate components fit together and the placement of the extension members in relation to the other components of said invention.
Figure 7:
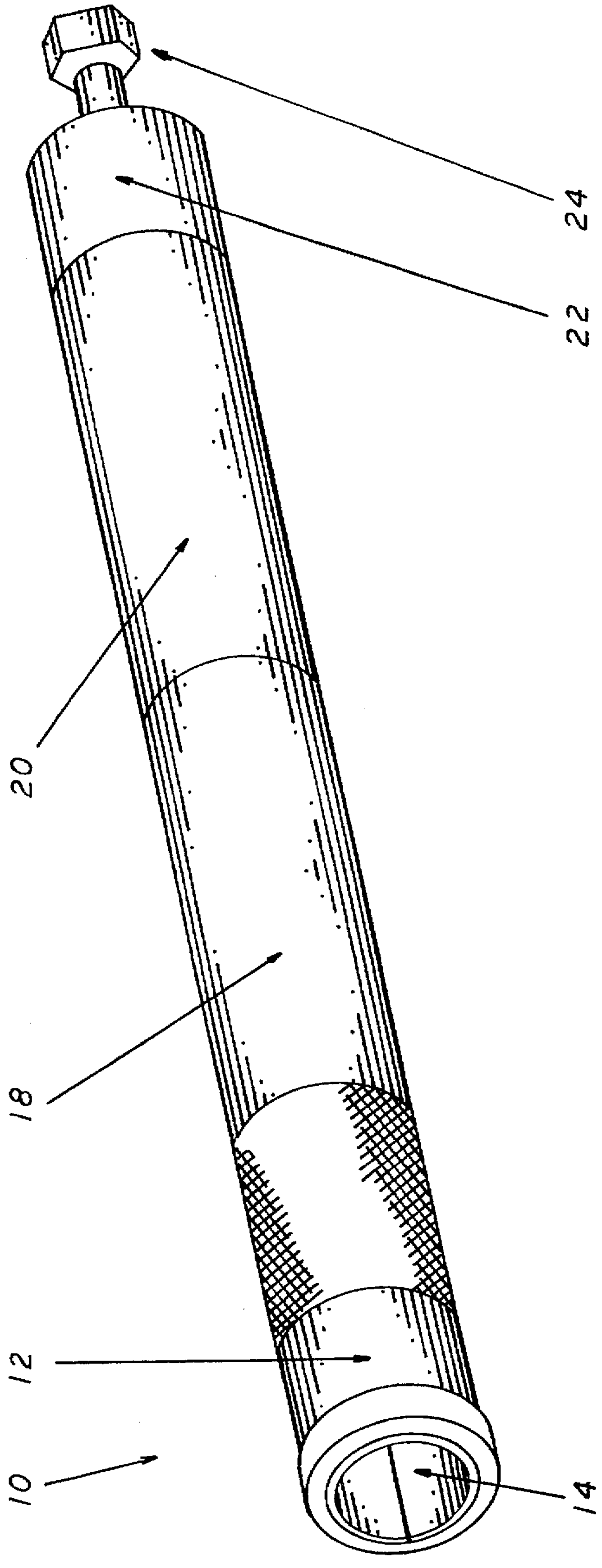
FIG. 7 is a perspective view of an adjustable bearing puller showing the orientation of its major components when it is in an extended position by the use of two extension members

Referring now to the drawings, and more specifically to FIGS. 1, 2 and 7, an adjustable bearing puller 10 comprises a long, cylindrical tube that is in part made up of a puller case 12 at its most forward end. The puller case 12 provides an enclosure for the puller sleeve 16, which is the component of the present invention that actually connects to and locks on the bearing to be pulled. The most reward end of the puller sleeve 16 is supplied with a set of male threads 26 which serve as the point of attachment to which other members of the present invention are connected by use of the female threads located on the inner surface of their most forward ends. The puller sleeve 16 is further inserted and held in place through the use of the puller case 12.

The male threads of the puller sleeve 16 can be attached to the female threads 28 of either the primary extension 18, the secondary extension 20, or the puller cap 22. Each of these members is equipped at its most forward end with a set of female threads 28 which engage the male threads 26 located at the most reward end of the primary extension 18 and the secondary extension 20. The puller cap 22 is located at the rear end of the present invention and houses the extraction bolt 24. The extraction bolt 24 is threaded longitudinally through the puller cap 22 and extends into the hollow tube created inside of the puller case 12 and the primary and secondary extensions, 18 and 20.

The number of extensions attached to the rear of the puller case 12 depends upon the overall length of the bearing puller 10 required by the job. For easy to reach bearings, the user would attach the puller cap 22 to the rear of the puller case 12. When a longer puller is required to reach a bearing, the user simply adds the primary or secondary extensions, 18 and 20, to the body of the present invention, the number of extensions, 18 and 20, used depends upon the length desired. It must also be noted that the number of extensions, 18 and 20, used is not limited to the two mentioned, but can be as many as needed by the specific application.

FIGS. 1 and 2 further show how a second sleeve or puller sleeve insert 14 can be placed inside of the puller sleeve 16.

Figure 3:
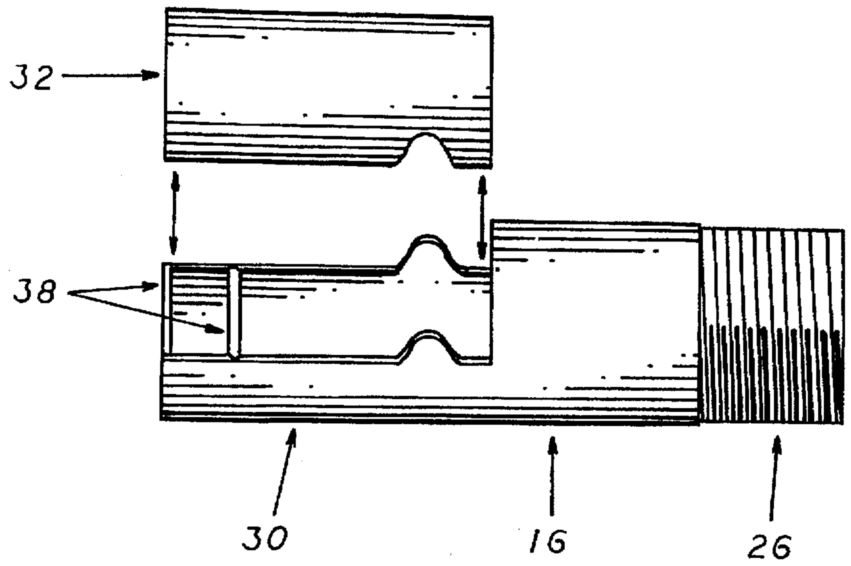
FIG. 3 is a side elevation view of the long puller sleeve component of the present invention showing the manner in which its individual pieces fit together.
Figure 4:
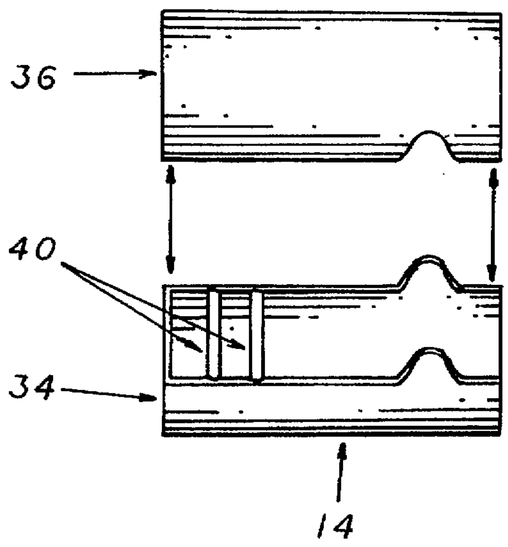
FIG. 4 is a side elevation view of the short puller sleeve component of the present invention showing the manner in which its individual pieces fit together.

FIGS. 3 and 4 show the two possible puller sleeves used with the present invention, the puller sleeve 16 and the second sleeve or puller sleeve insert 14. The long puller sleeve 16 has male threads 26 at its most reward end and is divided into a lower half 30 and an upper half 32. The inner surface of theses components contains the long sleeve locking rims 38. The split design of the long puller sleeve 16 allows it to slip over a bearing when not engaged by the puller case 12, then lock over the bearing by the use of the long sleeve bearing lock rim 38 when engaged by the puller case 12.

The second puller sleeve or puller sleeve insert 14 is also made up of a short sleeve upper half 36 and a short sleeve lower half 34. The puller sleeve insert 14 is used in conjunction with the puller sleeve 16 in order to grasp bearings of different sizes. The split design of the short puller sleeve 14 allows it to slip over a bearing and then to be further engaged by the locking rims 38 of the puller sleeve 16 and the puller case 12. The puller sleeve insert is further supplied with locking rims 40.

Figure 5:
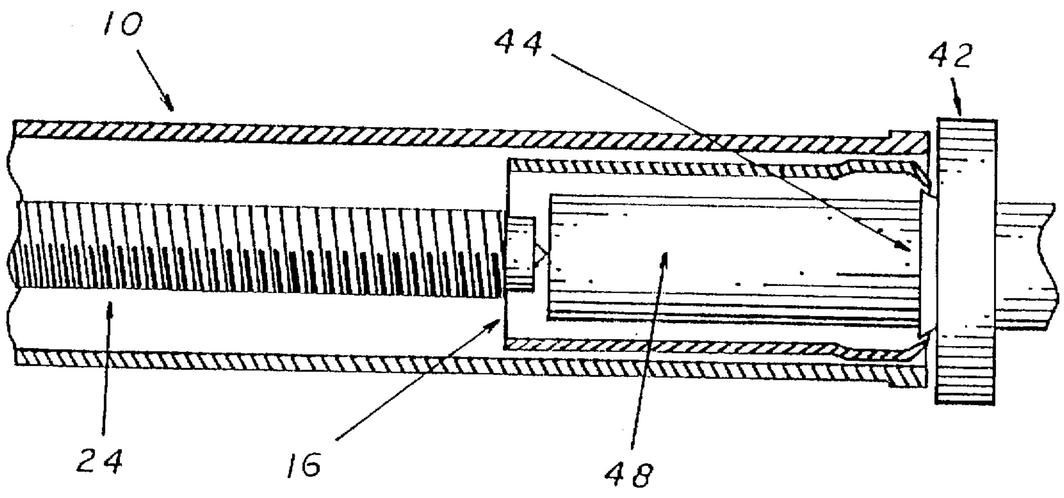
FIG. 5 is a side elevation cut-away view of the present invention showing the manner in which a puller sleeve attaches to the cam lock lip of a bearing in the extraction process.
Figure 6:
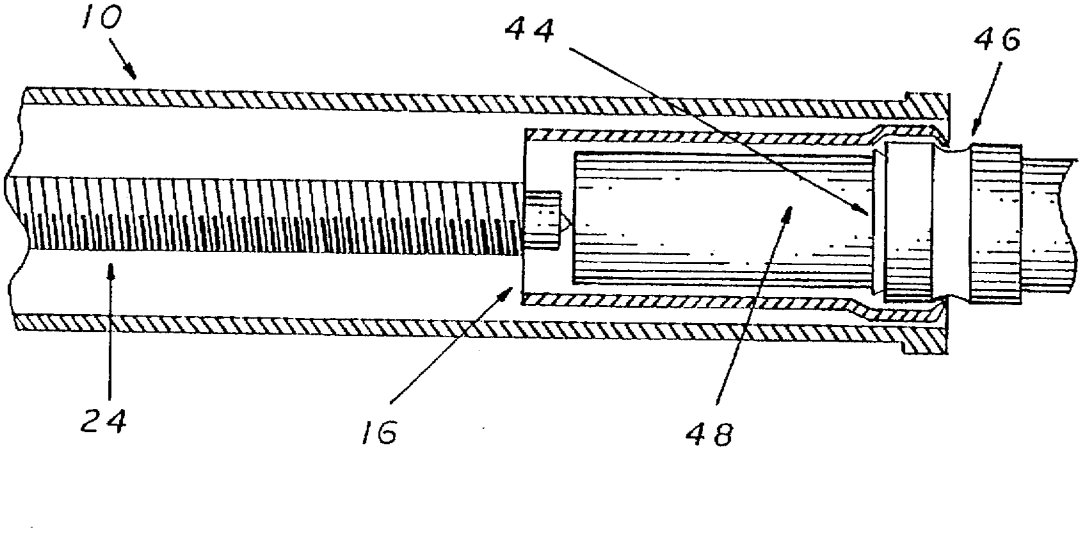
FIG. 6 is a side elevation cut-away view of the present invention showing the manner in which a puller sleeve attaches to the ball race of a bearing during the extraction process.

FIGS. 5 and 6 show the manner in which the bearing puller 10 engages a bearing 42 cam lock lip 44 or a ball race 46 of a typical bearing assembly. The bearing puller 10 slides over the bearing shaft 48 while the puller sleeve 16 engages either the cam lock lip 44 of a bearing 42 or a ball race 46. The extraction bolt 24 engages the outer end of the bearing shaft 48 and when rotational force is applied to the extraction bolt 24 the whole assembly is forced outwardly along the length of the bearing shaft 48, thus pulling the bearing 42 or the ball race 46 from the bearing shaft 48.

Although the present invention has been described in considerable detail with reference to certain preferred versions thereof, other versions are possible. Therefore, the spirit and scope of the appended claims should not be limited to the description of the preferred versions contained herein.

What is claimed is:

1. An improved bearing pulling apparatus comprising:

at least one split puller sleeve used to grasp a bearing, at least one of said sleeves is supplied with male threads;

an outer case defining a hollow inner portion so that said outer case may be placed about said split puller sleeve;

a hollow cylindrical bearing puller extension having a first and second end;

said extension having at said first end a female threaded portion adapted to be connected to the male threads on said sleeve;

said extension having at said second end a male threaded portion; and a cap having a first female thread portion for connecting to said extensions male threaded portion, said cap further forming a second smaller female threaded portion and a bolt threadably placed through said second threaded portion of said cap.

2. A bearing pulling apparatus as in claim 1 further comprising two or more hollow cylindrical bearing puller extensions.

* * * * *